United States Patent
Miyazawa et al.

(10) Patent No.: US 6,255,241 B1
(45) Date of Patent: Jul. 3, 2001

(54) METHOD OF PRODUCING FULLERENE-DISPERSED CERAMICS

(75) Inventors: Kun-ichi Miyazawa, Tokyo; Itaru Honma, Kashiwa; Junya Yano, Wako; Kunio Ito, Tokyo; Toru Kuzumaki, Kawasaki, all of (JP)

(73) Assignee: The University of Tokyo, Tokyo (JP)

( * ) Notice: Subject to any disclaimer, the term of this patent is extended or adjusted under 35 U.S.C. 154(b) by 0 days.

(21) Appl. No.: 09/405,595

(22) Filed: Sep. 27, 1999

(30) Foreign Application Priority Data

Mar. 18, 1999 (JP) .................................................. 11-072937

(51) Int. Cl.⁷ ......................... C04B 35/52; C04B 35/528; C04B 35/622
(52) U.S. Cl. ................................................................ 501/99
(58) Field of Search .................................................. 501/99

(56) References Cited

U.S. PATENT DOCUMENTS 5,420,081 * 5/1995 Mattes et al. ........................... 501/12

\* cited by examiner

*Primary Examiner*—Elizabeth D. Wood
(74) *Attorney, Agent, or Firm*—Burr & Brown

(57) ABSTRACT

A fullerene-dispersed ceramic is produced by an improved method in which $C_{60}$ or like fullerene, and $C_{16}TMA$ or like surfactant, are dissolved in a solution of metallic compound, such as zirconyl nitrate, to form a colloidal solution. A gel is formed from the colloidal solution by changing its hydrogen ion concentration. The gel is dried and subjected to heat treatment, to eliminate remaining solvent and surfactant, and thereby stably obtain the desired fullerene-dispersed ceramic powder in which the fullerene is uniformly dispersed and which is essentially free from carbon other than fullerene.

20 Claims, 5 Drawing Sheets

METHOD OF PRODUCING FULLERENE-DISPERSED CERAMICS

BACKGROUND OF THE INVENTION

1. Field of the Invention

The present invention relates to a method of producing fullerene-dispersed ceramics in which fullerene is effectively compounded into ceramics.

2. Description of Related Art

As known in the art, fullerene-dispersed ceramics can be advantageously applied to various materials, such as self-lubricating abrasive materials, low-friction, abrasion-resistance materials, ferroelectric or piezoelectric materials having high permittivity due to interface-polarization effect, computer memory, materials micro-actuator materials and the like. Therefore, fullerene-dispersed ceramics can be used in a wide range of industrial fields such as automobiles, domestic electric appliances, computers and the like.

The inventors have already proposed a method for producing a composite material of ceramics and fullerene such as $C_{60}$, as disclosed in Kunichi Miyazawa et al., "Characterization of $C_{60}$-Doped Zirconia Prepared from Organic Solutions", Processing and Fabrication of Advanced Materials VI, Volume I, The Institute of Materials, 1998, pp. 775–784. According to the method disclosed in this paper, the composite material is formed by preparing a solution of $C_{60}$ and metal alkoxide in which an organic solvent such as toluene is applied, and subjecting the solvent to drying and baking so as to make $C_{60}$-ceramics composite powder, and sintering the composite powder while it is filled in a copper case.

FIG. 1 shows a flowchart of the production process of the fullerene-dispersed ceramics according to the above-mentioned proposal, in which toluene is filled in a glass beaker in an amount of 100 to 200 ml. Zirconium tetra n-propoxide (ZNP) is added into the beaker and dissolved while stirring the solution. Subsequently, $C_{60}$ powder is added into the beaker and dissolved while stirring the solution. The toluene solution with $C_{60}$ and ZNP dissolved therein is left standing for about 1 to 3 days to cause gelation of the solution. The precipitation resulting from the gelation is dried in a vacuum atmosphere at a temperature of about 100 to 110° C., so as to obtain a dry gel of $C_{60}$ comprised of ZNP. The dry gel is baked to form a zirconia composite powder comprised of $C_{60}$, in an air atmosphere at, 400° C. for 30 minutes. In forming a sintered body, the powder is filled into a copper case in a nitrogen or an argon atmosphere, and then sintered at a temperature of 600° C. to 900° C., for 2 hours. The composition of the $C_{60}$-doped zirconia is, for instance, $ZrO_2$-3 to 30 mass% $C_{60}$.

With the above-mentioned method, however, it was often difficult to obtain composite ceramics in which $C_{60}$ was uniformly dispersed. FIG. 2a shows a scanning electron microscope image of the $C_{60}$-dispersed zirconia ceramics sintered body produced by the method shown in FIG. 1. FIG. 2b shows a carbon X-ray image of the sami specimen at the same site as shown in FIG. 2a. It is clear from the FIG. 2b that carbon is segregated in a size of 10 μm, and is not uniformly dispersed in the ceramic matrix.

In order to improve the uniformity of $C_{60}$ dispersion in the ceramic matrix, the inventors developed a method of producing a composite material of ceramics and fullerene by utilizing a so-called micelle formation method. According to this method, $C_{60}$-dispersed zirconiapowder is produced by forming $C_{60}$ micelle from a water solution of zirconyl nitrate $(ZrO(NO_3)_2)$ wherein $C_{60}$ is added, by using $C_{16}TMA$ $(CH_{16}H_{33}N(CH_3)_3Cl)$ as a surfactant, followed by formation of zircoma-gel corprising $C_{60}$ by controlling the acidity of the solution, and subsequent drying of the zirconia gel. The method is disclosed in Kunichi Miyazawa et al., "Production of $C_{60}$-$ZrO_2$ composite material and structural evaluation thereof" Abstracts of the Japan Institute of Metals, 1998, pp. 208. In this paper, $C_{60}$-dispersed zirconia powder is produced by dissolving $C_{16}TMA$ in a water solution of 100 $cm^3$ containing 0.1 mole $ZrO(NO_3)_2$, adding $C_{60}$ into the solution, stirring the solution for 12 hours, filtering the precipitate formed by dropping 2 mole NaOH in the solution, washing the precipitate by distilled water and then drying in the conditions of 150° C., 8 hours. According to this method, $C_{60}$ can be uniformly dispersed in the ceramics matrix, though it has been found that carbon other than $C_{60}$ still remains in the matrix. It would be highly desirable to realize $C_{60}$-dispersed ceramics, having a further improved purity.

SUMMARY OF THE INVENTION

Therefore, it is a primary object of the present invention to provide a method of producing fullerene-dispersed ceramics in which fullerene such as $C_{60}$ can be uniformly dispersed in the ceramic matrix and carbon except $C_{60}$ can be effectively eliminated from the matrix.

The inventors conducted thorough investigations for the purpose of achieving the stated object, and arrived at a novel recognition that most of residual carbon except $C_{60}$ in the $C_{60}$-ceramics composite powder is originated from the surfactant such as $C_{16}TMA$, and that the organic matter originated in the surfactant is almost completely by carrying out the heat treatment to the powder under a relatively high temperature condition. Such recognition resulted in conception of the present invention, the features of which will be explained below.

The present invention provides a method of producing fullerene-dispersed ceramic pack which comprises the steps of:
  forming a colloidal solution by dissolving a fullerene and a surfactant in a solution of metallic compound;
  forming a gel from the colloidal solution by changing the hydrogen ion concentration thereof;
  drying the gel; and
  heat treating the gel so as to eliminate the remainder of the solvent and the surfactant.

The present invention further provides a method of producing fullerene-dispersed ceramics using the fullerene-dispersed ceramic powder described above, and then sintering the powder.

The preferable heat treatment conditions for carrying out the method according to the invention are described below.
  atmosphere: air atmosphere, inert gas atmosphere or vacuum atmosphere
  temperature: 250 to 500° C.
  time: 0.5 to 4 hours When sintering is carried out according to the invention, various types of sintering methods can be applied. However, the hot pressing method is particularly suitable as it is carried out under very high pressure so as to obtain a sintered body having an even higher density. Moreover, by applying the very high pressure hot pressing method, it is possible to produce a polymerized $C_{60}$-dispersed ceramic or ceramic in which superfine diamond grains are dispersed as a result of enhanced polymerization or transformation of $C_{60}$.

In the method according to the invention, it is preferred that the metallic compound comprises zirconyl nitrate, the fullerene is $C_{60}$, and/or the surfactant is $C_{16}TMA$. By using zirconyl nitrate as the metallic compound, $C_{60}$ as fullerene and $C_{16}TMA$ as the surfactant, $C_{60}$-dispersed zirconia ceramics can be readily produced.

In addition, for carrying out the method according to the present invention, there may be used various types of metallic compound solutions provided that ceramic precursor is contained, therein as well as various types of surfactant provided that they are suitable for forming micelle in which fullerene is surrounded by surfactant. Moreover, the preferable amount of the surfactant per the amount of ceramic is within a range of about molar ratio 1:10 to 1:1.

BRIEF DESCRIPTION OF THE DRAWING

FIG. 2a is a photograph showing a scanning electron microscope image of the $C_{60}$ dispersed zirconia ceramics produced by the method of FIG. 1;

FIG. 2b is a photograph showing a carbon X-ray image of the same specimen at the same site as shown in FIG. 2a;

FIG. 4a is a photograph showing a scanning electron microscope image of the $C_{60}$-dispersed zirconia ceramics produced in accordance with the present invention;

FIG. 4b is a photograph showing a carbon X-ray image of the same specimen and at the same site as shown in FIG. 4a;

DETAILED DESCRIPTION OF THE PREFERRED EMBODIMENT

The present invention will be explained below in further detail.

According to the present invention, fullerene-dispersed ceramics are produced by a method in which solution of a metallic compound, for example, water a solution of metallic ions is prepared by dissolving salt or a similar metallic compound therein. Then, fullerene comprised of colloidal solution or sol is formed by dissolving a surfactant such as $C_{16}TMA$ and fullerene such as $C_{60}$ therein. Micelles are then formed in the colloidal solution, in which fullerene is surrounded with the surfactant. Subsequently, the hydrogen ion concentration of the colloidal solution is controlled to increase either acidity or alkalinity by adding acid or alkali into the solution, thereby obtaining precipitation of ceramics comprising fullerene. The precipitate is separated from the solution by filtration, and dried and then subjected to a heat treatment under predetermined conditions so as to obtain the fullerene-dispersed ceramic powder. For instance, the heat treatment is carried out at a temperature of 100 to 600° C., in air atmosphere, vacuum or inert-gas atmosphere. By compacting and sintering such fullerene-dispersed ceramics powder, there can be obtained a ceramics sintered body.

A concrete example of the method according to the present invention as applied to practical production of $C_{60}$-dispersed zirconia ceramics is described below.

First of all, a water solution of $ZrO(NO_3)_2$ having a concentration of 0.1 mole was prepared. A surfactant comprised of $C_{16}TMA$ was dissolved into 100 ml of the water solution. Furthermore, $C_{60}$ was added and dissolved in the water solution. The concentration of $C_{16}TMA$ per zirconia was within a range of molar ratio 1:10 to 1:1. Then, by dropping 2 mole NaOH solution of 10 ml, a precipitate was formed in the water solution. The precipitate was filtered and washed by distilled water, and then dried in an air atmosphere, in a temperature range of 100 to 150° C. and for 8 hours, so as to obtain the $C_{60}$-dispersed zirconia ceramic powder. The composition of the fullerene-dispersed ceramic obtained according to the invention may be controlled as appropriate, for instance, within a range of $ZrO_2$-0 to 30 mass% $C_{60}$. The powder obtained as mentioned above was subjected to a further heat treatment in an air atmosphere, at a temperature of 400° C. for 3 hours, so as to eliminate residual solvent and organic matter originated in the $C_{16}TMA$, to produce $ZrO_2$-3 mass% $C_{60}$ powder. The so-obtained $ZrO_2$-3 mass% $C_{60}$ powder was submitted to instrumental analyses. Further a plurality of specimens of $ZrO_2$-3 mass% $C_{60}$ powders were produced by changing the heat treatment temperature condition. These specimens were also submitted to instrumental analysis.

Figure 3A:
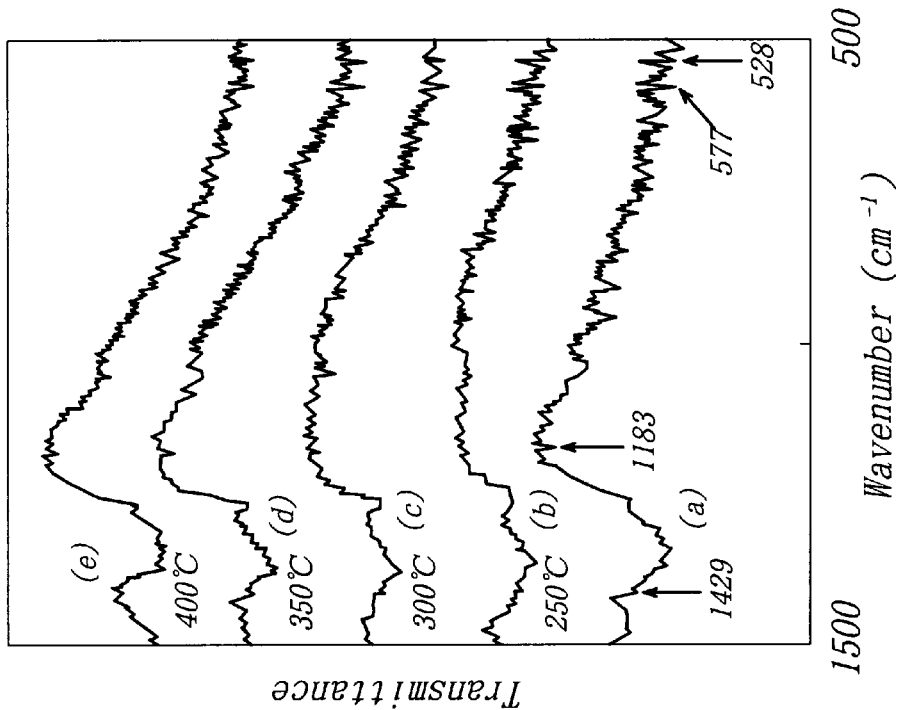
FIG. 3a is a graph showing Fourier transform infrared absorption spectrum of the $C_{60}$-dispersed zirconia ceramics powder within the wave number range of 3300 to 2500 $cm^{-1}$.
Figure 3B:
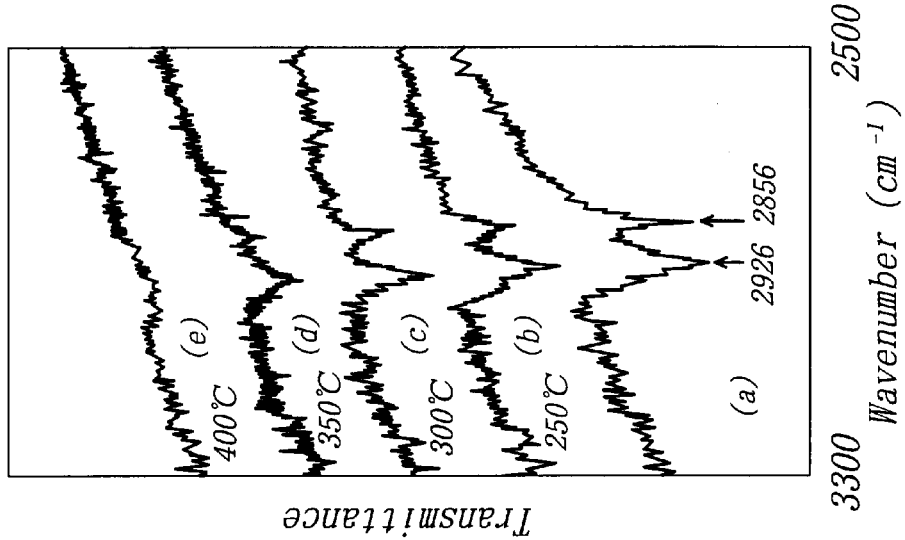
FIG. 3b is a graph showing Fourier transform infrared absorption spectrum of the $C_{60}$-dispersed zirconia ceramics powder within the wave number range of 1500 to 500 $cm^{-1}$.

FIG. 3a shows a graph of Fourier transform infrared absorption spectrum of the $C_{60}$-dispersed zirconia ceramic powder within the wave number range of 3300 to 2500 $cm^{-1}$, and FIG. 3b shows a graph of the same within the wave number range of 1500 to 500 $cm^{-1}$. As shown in FIG. 3a, by the heat treatment at a temperature of 400° C., the absorption peaks caused by existence of $C_{16}TMA$ have essentially disappeared. On the other hand, the absorption peaks of 1429 $cm^{-1}$, 1183 $cm^-$, 577 $cm^{-1}$, and 528 $cm^{-1}$ which are caused by existence of $C_{60}$ can be observed from FIG. 3b. It is clear that the organic matters except $C_{60}$ in the $ZrO_2$-$C_{60}$ composite powder can be almost completely eliminated by carrying out the heat treatment at a temperature of 400° C., for 3 hours. Thus, a particularly advantageous effect is achieved by the heat treatment in the production method of $C_{60}$-dispersed zirconia ceramic powder according to the invention.

A $C_{60}$-dispersed zirconia ceramic sintered body was produced from the $C_{60}$-dispersed zirconia ceramic powder which was filled into a gold case (internal diameter: 5 mm), height: 10 mm, and subjected to sintering by using NaCl as a pressure medium, under a pressure of 5.5 GPa, temperature of 600° C. and for 2 hours.

Figure 1:
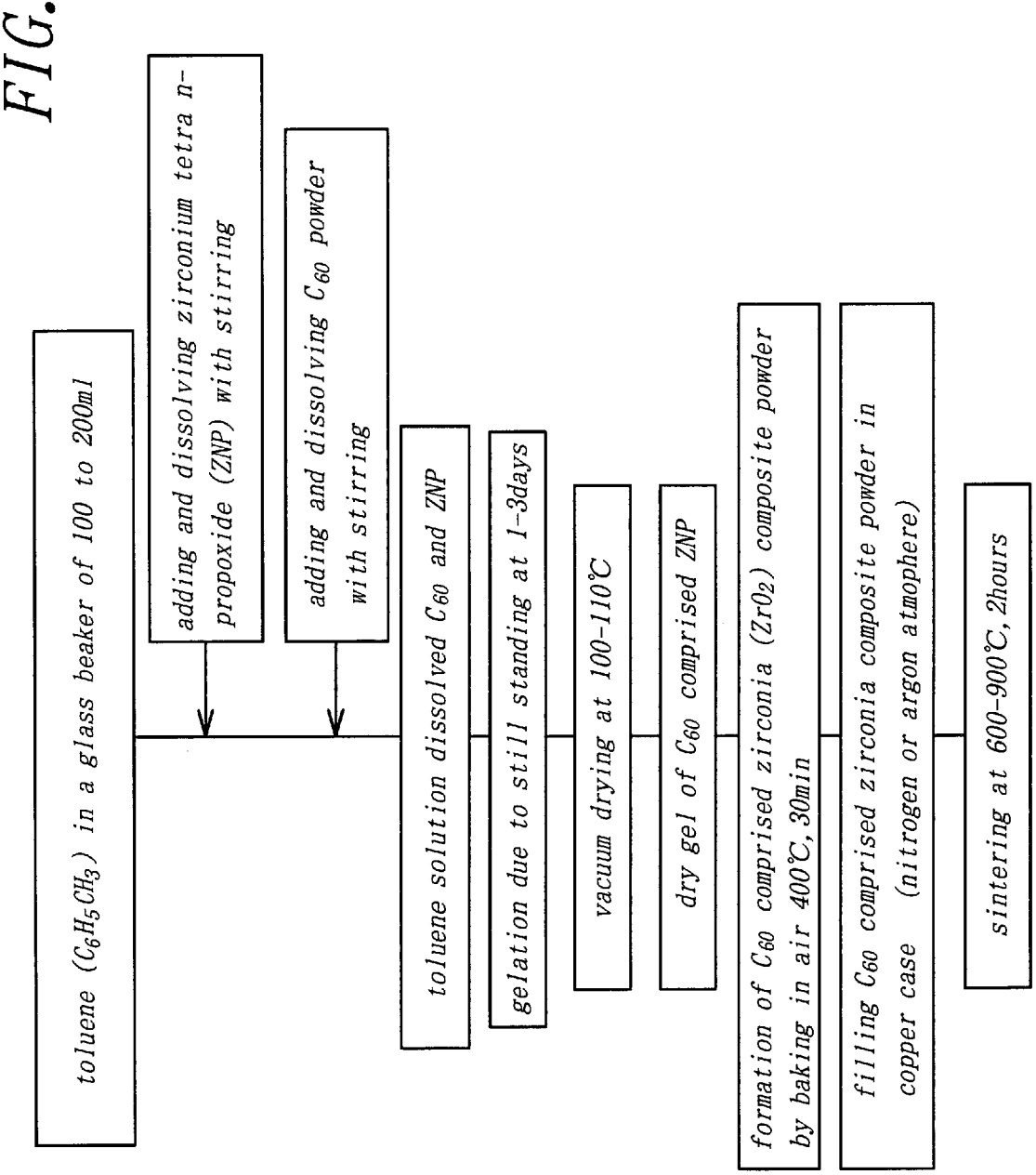
FIG. 1 is a flowchart showing the above-mentioned known production process of the fullerene-dispersed ceramics.
Figure 2:
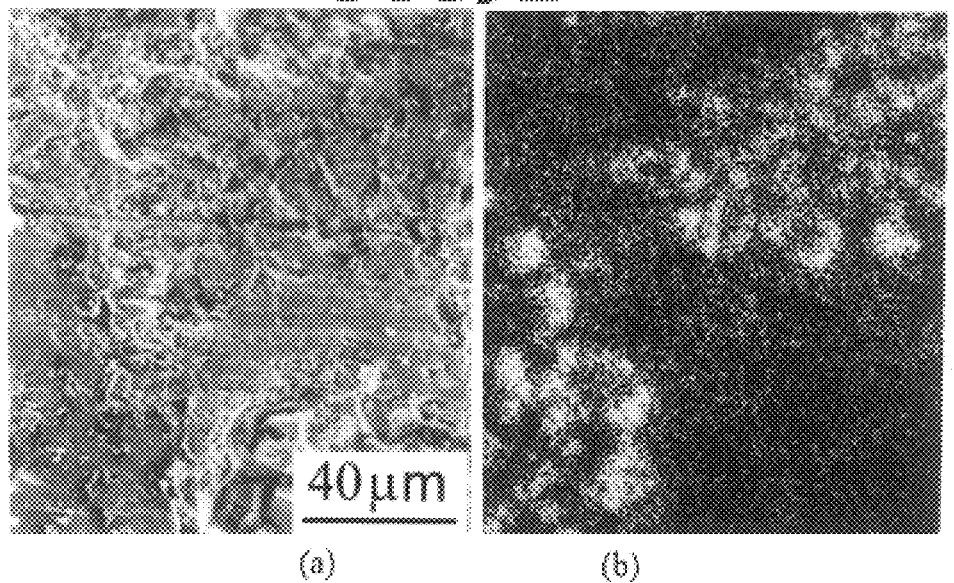
Figure 4:
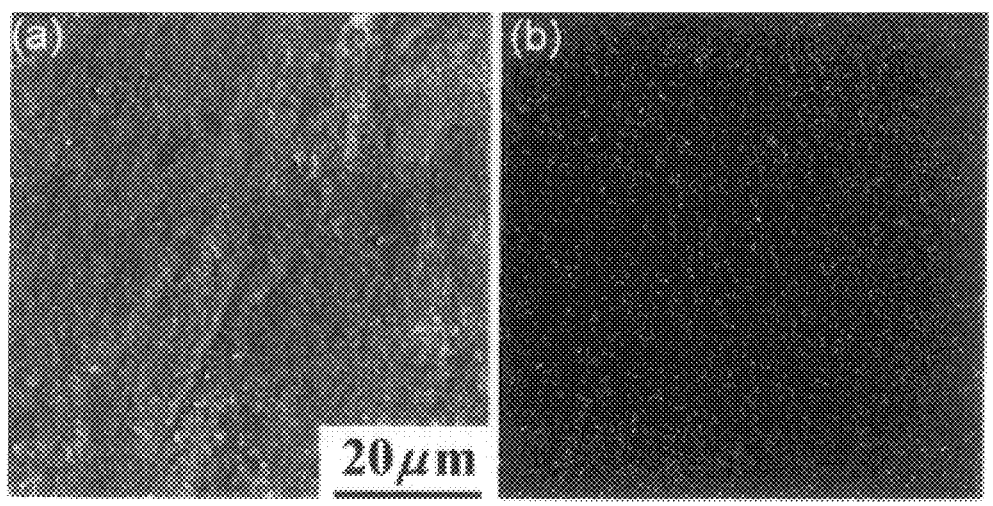

FIG. 4a shows a scanning electron microscope image of the $C_{60}$-dispersed zirconia ceramic sintered body produced as described above. FIG. 4b shows a carbon X-ray image of the same specimen and at the same site as shown in FIG. 4a. As can be appreciated from FIG. 4a and 4b, in contrast to FIGS. 2a and 2b as mentioned above, the sintered body produced according to this invention is featured by a uniform dispersion of $C_{60}$ in the zirconia matrix.

Figure 5:
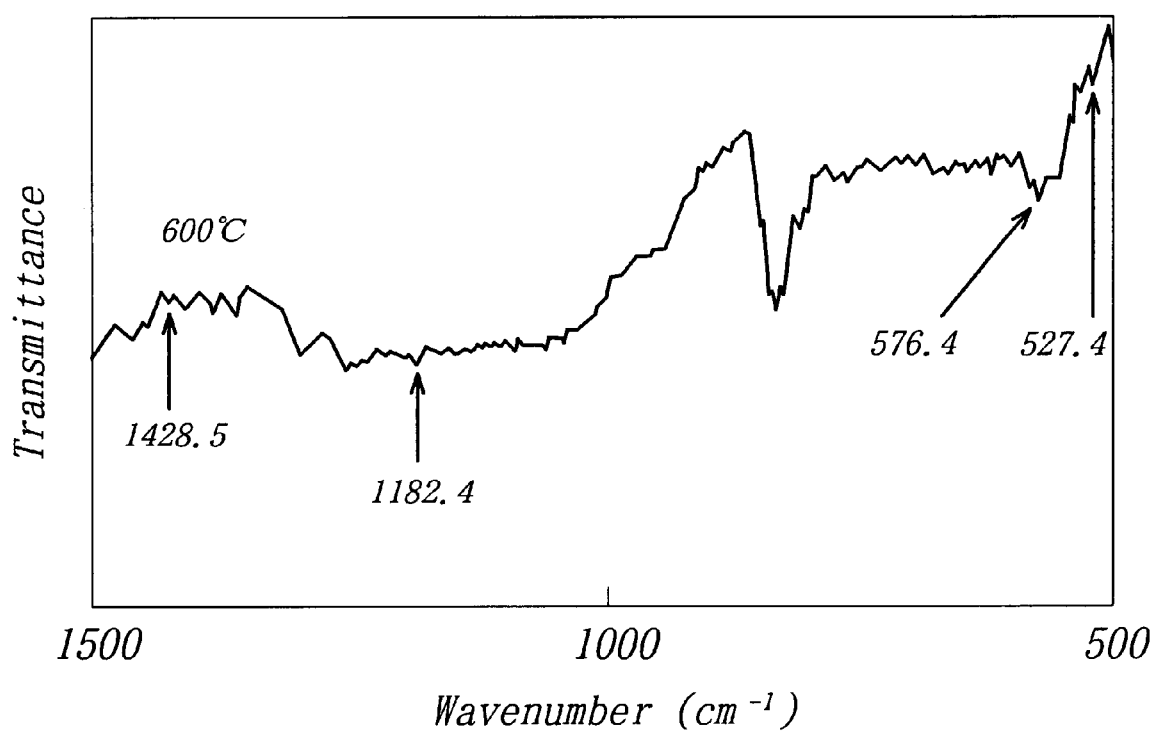
FIG. 5 is a graph showing Fourier transform infrared absorption spectrum of the $C_{60}$-dispersed zirconia ceramics sintered body produced in accordance with the present invention.

FIG. 5 shows a graph of Fourier transform infrared absorption spectrum of the sintered body. As shown in FIG. 5, there can be observed four absorption peaks (1428.5 $cm^{-1}$, 1182.4 $cm^{-1}$, 576.4 $cm^{-1}$ and 527.4 $cm^{-1}$) which are characteristic to $C_{60}$, and which thus indicate the existence of $C_{60}$ in the sintered body.

Figure 6:
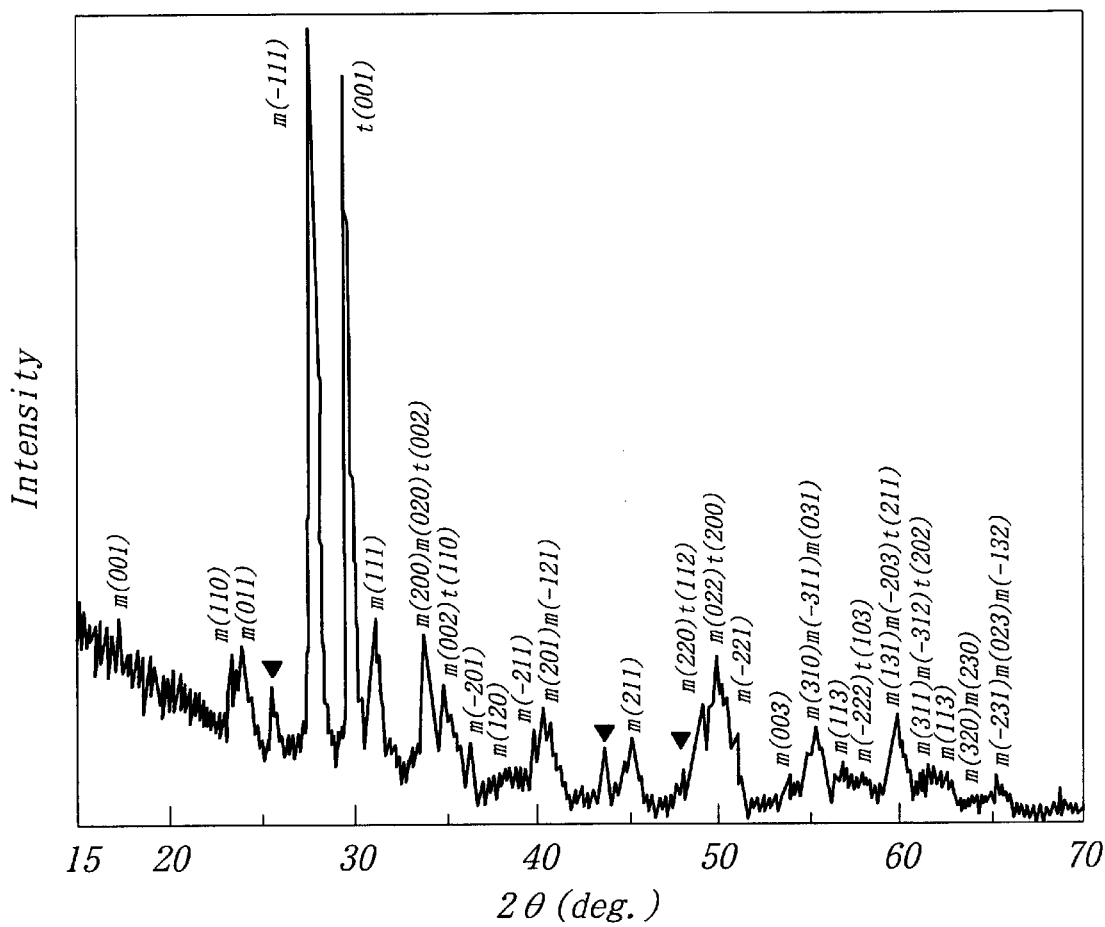
FIG. 6 is a chart showing X-ray diffraction of the same specimen as shown in FIG. 5.

Moreover, FIG. 6 shows a chart of X-ray diffraction of the same sintered body as described above. It can be confirmed from FIG. 6 that the sintered body comprises two kinds of crystals, which are cubic zirconia and monoclinic zirconia.

It can be appreciated from the foregoing detailed description that, by the method according to the present invention, it is possible to stably obtain fullerene-dispersed ceramic powder in which fullerene is uniformly dispersed and carbon other than fullerene is essentially eliminated. The fullerene-dispersed ceramic powder obtained by the method according to the present invention is highly suitable for producing fullerene-dispersed ceramic sintered bodies having excellent uniformity and high-density.

The method according to the present invention can be applied to various technical fields, for example, production of piezoelectric elements, bearings, slide members, self-lubricating abrasives, self-lubricating abrasive disks, gas separation films, oxide-based superconducting ceramic, high-lubricity abrasion-resistance ceramic films, interface-polarized type ferroelectric ceramics, piezoelectric ceramics and the like. The present invention can also be applied to other fields, for example, the agricultural, medical, and pharmacy fields.

While the present invention has been described with reference to some specific examples, various changes or modifications may be made without departing from the scope of the invention as defined by the appended claims. For instance, it is possible to produce a fullerene-dispersed ceramic film instead of a fullerene-dispersed ceramic powder as explained above, by applying a colloidal solution according to the invention onto a substrate, causing gelation, and drying and heat treating the gel on the substrate.

What is claimed is:

1. A method of producing fullerene-dispersed ceramic powder, comprising the steps of:
    forming a colloidal solution by dissolving fullerene and a surfactant in a solution of metallic compound;
    forming a gel from the colloidal solution by changing the hydrogen ion concentration thereof;
    drying the gel; and
    heat-treating the dried gel under conditions effective to substantially eliminate any remaining solvent, surfactant and any organic matter other than fullerene.

2. The method of claim 1, wherein said metallic compound comprises zirconyl nitrate.

3. The method of claim 1, wherein said fullerene is $C_{60}$.

4. The method of claim 1, wherein said surfactant is $C_{16}$TMA.

5. The method of claim 1, wherein said metallic compound comprises a zirconia precursor and said fullerene is $C_{60}$.

6. The method of claim 1, wherein said drying step is performed at a temperature within a range of 100° C. to 150° C.

7. The method of claim 6, wherein said drying step is performed in an air atmosphere.

8. The method of claim 1, wherein said heat-treating step is performed at a temperature within a range of 250° C. to 500° C.

9. The method of claim 8, wherein said heat-treating step is performed for 0.5 hours to 4 hours.

10. A method of producing fullerene-dispersed sintered ceramic body, comprising the steps of:
    forming a colloidal solution by dissolving fullerene and a surfactant in a solution of metallic compound;
    forming a gel from the colloidal solution by changing the hydrogen ion concentration thereof;
    drying the gel;
    heat-treating the dried gel under conditions effective to substantially eliminate any remaining solvent, surfactant, and organic matter other than fullerene to provide a fullerene-dispersed ceramic powder; and
    sintering the ceramic powder to form a sintered ceramic body.

11. The method of claim 10, further comprising the steps of molding the ceramic powder to form a molded body, and then sintering said molded body.

12. The method of claim 10, wherein said metallic compound comprises zirconyl nitrate.

13. The method of claim 10, wherein said fullerene is $C_{60}$.

14. The method of claim 10, wherein said surfactant is $C_{16}$TMA.

15. The method of claim 10, wherein said metallic compound comprises a zirconia precursor and said fullerene is $C_{60}$.

16. The method of claim 10, wherein said drying step is performed at a temperature within a range of 100° C. to 150° C.

17. The method of claim 16, wherein said drying step is performed in an air atmosphere.

18. The method of claim 10, wherein said heat-treating step is performed at a temperature within a range of 250° C. to 500° C.

19. The method of claim 18, wherein said heat-treating step is performed for 0.5 hours to 4 hours.

20. The method of claim 10, wherein said sintering step is performed at a temperature exceeding the heat-treating temperature.

* * * * *